United States Patent
Seo

(10) Patent No.: US 9,952,717 B2
(45) Date of Patent: Apr. 24, 2018

(54) DISPLAY DEVICE WITH COMMON VOLTAGE COMPENSATION

(71) Applicant: LG Display Co., Ltd., Seoul (KR)

(72) Inventor: Seungpyo Seo, Daegu (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/968,457

(22) Filed: Dec. 14, 2015

(65) Prior Publication Data
US 2016/0188115 A1    Jun. 30, 2016

(30) Foreign Application Priority Data
Dec. 24, 2014 (KR) .................. 10-2014-0188866

(51) Int. Cl.
G06F 3/041 (2006.01)
G09G 3/36 (2006.01)
G02F 1/1333 (2006.01)

(52) U.S. Cl.
CPC .......... G06F 3/0418 (2013.01); G06F 3/0412 (2013.01); G06F 3/0416 (2013.01);
(Continued)

(58) Field of Classification Search
CPC .................................. G06F 3/03547–3/047
(Continued)

(56) References Cited

U.S. PATENT DOCUMENTS

2007/0002005 A1* 1/2007 Kim ............. G09G 3/3655
345/103
2012/0313866 A1* 12/2012 Ha .............. G06F 3/0416
345/173
(Continued)

FOREIGN PATENT DOCUMENTS

JP    2006-018278 A    1/2006
JP    2008-275818 A    11/2008
(Continued)

OTHER PUBLICATIONS

Korean Office Action, Korean Application No. 10-2014-0188866, dated Apr. 6, 2016, 5 pages (with concise explanation of relevance).
(Continued)

*Primary Examiner* — Roy P Rabindranath
(74) *Attorney, Agent, or Firm* — Fenwick & West LLP

(57) ABSTRACT

A touch sensing display device that compensates for common voltage differences. The display device includes a first touch channel, a second touch channel, and an integrated circuit. The integrated circuit includes a first input terminal to receive a common voltage and a second input terminal to receive a supply voltage, a first touch pad coupled to the first touch channel of the display device, and a second touch pad coupled to the second touch channel of the display device. The integrated circuit also includes a first touch driving circuit coupled to the first touch pad to generate a compensated common voltage based on the supply voltage and to output the compensated common voltage onto the first touch pad. The integrated circuit also includes a second touch driving circuit coupled to the second touch pad, the second touch driving circuit to output the common voltage onto the second touch pad.

14 Claims, 11 Drawing Sheets

(52) U.S. Cl.
CPC ....... *G09G 3/3685* (2013.01); *G02F 1/13338* (2013.01); *G09G 2320/0223* (2013.01)

(58) Field of Classification Search
USPC .................................................. 345/173–178
See application file for complete search history.

(56) References Cited

U.S. PATENT DOCUMENTS

| | | | | |
|---|---|---|---|---|
| 2013/0278525 | A1* | 10/2013 | Lim | G06F 3/0416 345/173 |
| 2013/0314393 | A1* | 11/2013 | Min | G09G 3/36 345/212 |
| 2013/0321296 | A1* | 12/2013 | Lee | G06F 3/041 345/173 |
| 2013/0335342 | A1* | 12/2013 | Kim | G06F 3/044 345/173 |
| 2014/0184534 | A1* | 7/2014 | Lee | G06F 3/0412 345/173 |
| 2014/0240279 | A1 | 8/2014 | Hwang et al. | |
| 2015/0205433 | A1* | 7/2015 | Mizuhashi | G06F 3/0416 345/174 |

FOREIGN PATENT DOCUMENTS

| | | |
|---|---|---|
| JP | 2014-130347 A | 7/2014 |
| KR | 10-2008-0107778 A | 12/2008 |
| KR | 10-2011-0112128 A | 10/2011 |
| KR | 10-2013-0139679 A | 12/2013 |

OTHER PUBLICATIONS

European Extended Search Report, European Application No. 15201356.1, dated Apr. 12, 2016, 11 pages.

Japanese Office Action, Japanese Application No. 2015-224377, dated Oct. 4, 2016, 4 pages (with concise explanation of relevance).

* cited by examiner

DISPLAY DEVICE WITH COMMON VOLTAGE COMPENSATION

This application claims the benefit of Korean Patent Application No. 10-2014-0188866, filed on Dec. 24, 2014, which is incorporated herein by reference for all purposes as if fully set forth herein.

BACKGROUND

Field of the Disclosure

Embodiments of the disclosure relate to a display device having a touch sensor.

Description of the Related Art

As various electronic devices including home appliances, portable information devices, etc. are becoming more light-weight and slimmer, user input means is being switched from a button switch to a touch sensor. Hence, the electronic device, for example, a display device, that has been recently released, has the touch sensor (or a touch screen).

The touch sensor has been essentially adopted in the portable information devices, such as smart phones, and has gradually been adopted in display devices such as notebook computers, computer monitors, and home appliances. A technology has been recently proposed to embed the touch sensor in a pixel array of a display panel. The touch sensor, to which the technology is applied, is referred to as an in-cell touch sensor.

In the in-cell touch sensor technology, touch sensors may be installed in the display panel without an increase in a thickness of the display panel. The electronic device having the in-cell touch sensor time-divides one frame period into a period (hereinafter, referred to as "a display driving period") for driving subpixels and a period (hereinafter, referred to as "a touch screen driving period") for driving the touch sensors, so as to reduce a mutual influence attributable to the coupling between the subpixels and the touch sensors.

In the in-cell touch sensor technology, electrodes connected to the subpixels of the display panel are used as electrodes of the touch sensors. For example, the in-cell touch sensor technology may include a method of dividing a common electrode for supplying a common voltage to pixels of a liquid crystal display and using the divided common electrodes as the electrodes of the touch sensors.

Some of the display devices, to which the in-cell touch sensor technology is applied, have to satisfy a VESA standard. The in-cell touch sensor technology uses an integrated driving circuit, in which a touch screen driving circuit (for example, a readout integrated circuit (ROIC)) is embedded in a data driving circuit, due to its structural characteristics.

In this instance, the integrated driving circuit has to supply the common voltage to the display panel. However, there is a considerable limit to a distance between a flexible printed circuit board (FPCB) and an input terminal of the integrated driving circuit because of a limit of the size attributable to the VESA standard. Because of this, in a related art, predetermined electric power is supplied only to one side of the integrated driving circuit, so as to satisfy an input resistance requirement of the integrated driving circuit.

For this reason, when a predetermined pattern is represented on the display panel, the related art method generates a block dim (indicating a phenomenon in which the screen of the display panel becomes dim on a per block basis) attributable to a deviation of the common voltage and reduces the display quality of the display panel.

SUMMARY

In one aspect, there is a display device having a touch sensor comprising a display panel configured to display an image, a touch screen positioned inside the display panel, and an integrated driving circuit configured to output a common voltage during a display driving period for displaying an image on the display panel and output a touch driving signal during a touch screen driving period for sensing the touch screen, wherein the integrated driving circuit includes a data driving circuit configured to output a data signal to the display panel, and a pair of touch screen driving circuits positioned separately from the data driving circuit and configured to output the touch driving signal to the touch screen, the pair of touch screen driving circuits including a pair of common voltage compensation circuits activated or inactivated in response to an active signal output from an external controller, wherein an activated common voltage compensation circuit of the pair of common voltage compensation circuits outputs a compensated common voltage for compensating for the common voltage supplied to the display panel.

In one embodiment, an integrated circuit is disclosed. The integrated circuit comprises a first input terminal to receive a common voltage. A first touch pad is for coupling to a first touch channel of a display device. A first touch driving circuit is coupled to the first touch pad. The first touch driving circuit comprises a first common voltage compensation circuit to output either the common voltage or a first compensated common voltage to the first touch pad depending on whether the first common voltage compensation circuit is activated.

In one embodiment, the first common voltage compensation circuit selects between the first compensated common voltage and touch driving signals responsive to a signal indicating a division between a touch driving period and a display driving period.

In one embodiment, the integrated circuit includes a second input terminal is to receive a supply voltage. The first compensated common voltage is derived from the supply voltage.

In one embodiment, the common voltage compensation circuit comprises a resistor string to generate a plurality of different voltages based on the supply voltage and a circuit to select the first compensated common voltage from amongst the plurality of different voltages.

In one embodiment, the common voltage compensation circuit adjusts the first compensated common mode voltage based on a common voltage compensation signal.

In one embodiment, integrated circuit includes a second touch pad is for coupling to a second touch channel of the display device. The integrated circuit includes a second touch driving circuit coupled to the second touch pad. The second touch driving circuit comprises a second common voltage compensation circuit to output either the common voltage or a second compensated common voltage to the second touch pad depending on whether the second common voltage compensation circuit is activated.

In one embodiment, the first touch driving circuit is located on a first side of the integrated circuit, the second touch driving circuit is located on a second side of the integrated circuit, and a data driving circuit is located between the first touch driving circuit and the second touch driving circuit.

In one embodiment, the integrated circuit includes a first pin to receive a first activation signal activating the first common voltage compensation circuit. The integrated circuit also includes a second pin to receive a second activation signal activating the second common voltage compensation circuit.

In one embodiment, a display device is disclosed that includes the integrated circuit. The display device also includes a timing controller to generate the first activation signal and the second activation signal. In one embodiment, the first input terminal is further from the first common voltage compensation circuit than the second common voltage compensation circuit. The timing controller generates the first activation signal to activate the first common voltage compensation circuit and generates the second activation signal to deactivate the second common voltage compensation circuit.

In one embodiment a display device comprises a first touch channel, a second touch channel, and an integrated circuit. The integrated circuit comprises a first input terminal to receive a common voltage, a second input terminal to receive a supply voltage, a first touch pad coupled to the first touch channel of the display device, and a second touch pad coupled to the second touch channel of the display device. The integrated circuit also includes a first touch driving circuit coupled to generate a compensated common voltage based on the supply voltage and to output the compensated common voltage onto the first touch pad, and a second touch driving circuit coupled to the second touch pad, the second touch driving circuit to output the common voltage onto the second touchpad.

In one embodiment, the first touch driving circuit also selectively outputs either the compensated common voltage or a touch driving signal responsive to a signal indicating a division between a touch driving period and a display driving period.

In one embodiment, the first touch driving circuit comprises a resistor string to generate a plurality of different voltages based on the supply voltage; and a circuit to select the compensated common voltage from amongst the plurality of different voltages.

In one embodiment, the first touch driving circuit adjusts the first compensated common mode voltage based on a common voltage compensation signal.

In one embodiment, the first touch driving circuit is located on a first side of the integrated circuit, the second touch driving circuit is located on a second side of the integrated circuit, and a data driving circuit is located between the first touch driving circuit and the second touch driving circuit. In one embodiment, the first input terminal is further from the first touch driving circuit than the second touch driving circuit.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION OF THE EMBODIMENTS

Reference will now be made in detail to embodiments of the disclosure, examples of which are illustrated in the accompanying drawings. Wherever possible, the same reference numbers will be used throughout the drawings to refer to the same or like parts. A detailed description of known arts will be omitted if it is determined that the arts can mislead the embodiments of the disclosure.

Exemplary embodiments of the disclosure will be described with reference to FIGS. 1 to 16.

A display device having a touch sensor according to an exemplary embodiment of the disclosure may be implemented as a television system, a navigation system, a DVD player, a Blu-ray player, a personal computer (PC), a home theater system, and a mobile phone system (or a smart phone system).

Further, the display device having the touch sensor according to the embodiment of the disclosure may use a display panel, such as a liquid crystal display panel, an organic light emitting diode display panel, an electrophoresis display panel, and a plasma display panel. In the following description, the embodiment of the disclosure will be described using the liquid crystal display panel as an example of the display panel for the sake of brevity and ease of reading. Other display panels may be used.

First Embodiment

Figure 1:
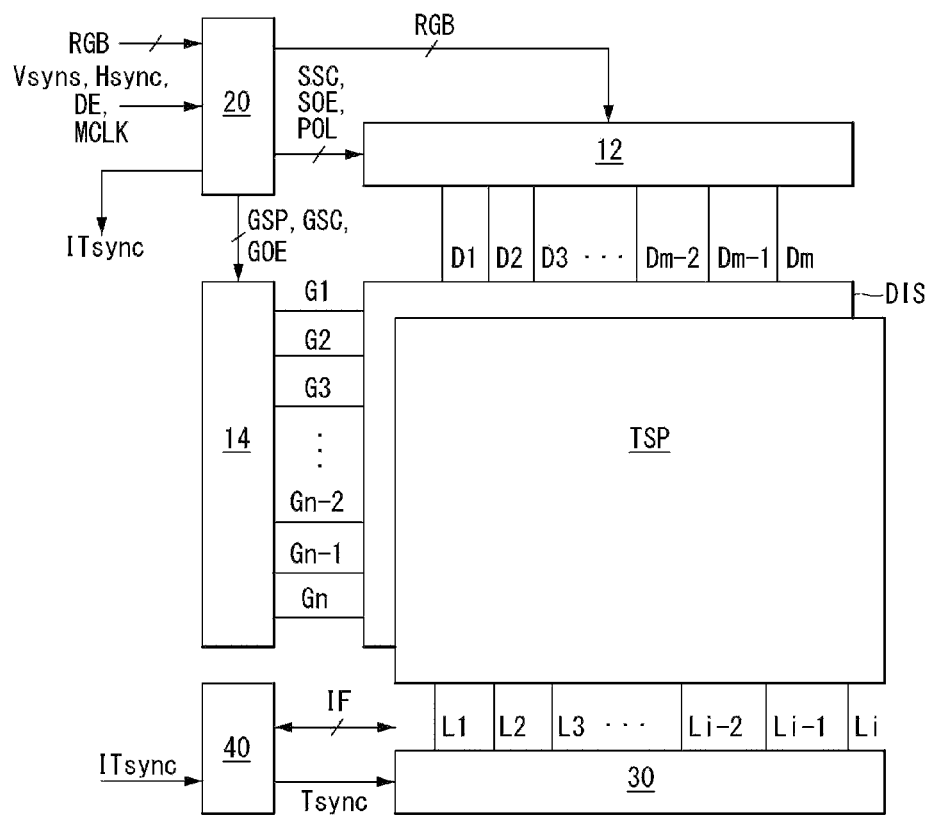
FIG. 1 is a block diagram schematically showing configuration of a display device according to a first embodiment of the disclosure.
Figure 2:
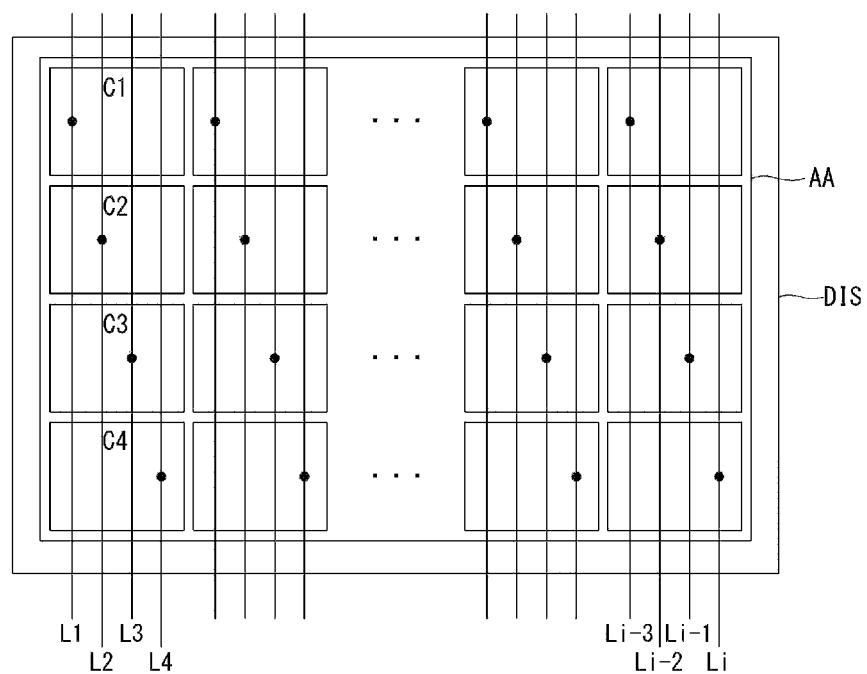
FIG. 2 schematically shows a touch sensor of a touch screen.
Figure 3:
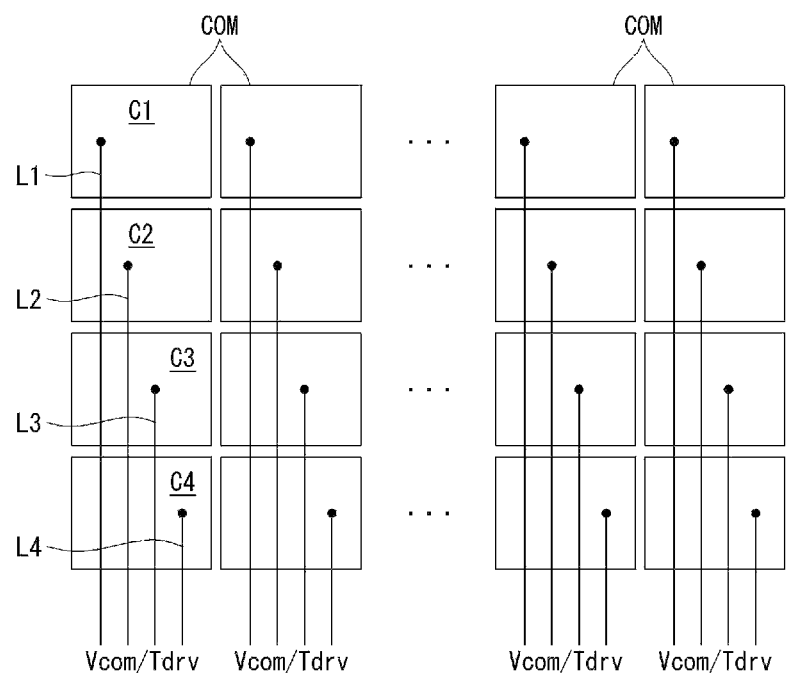
FIG. 3 shows a touch screen including a common electrode.
Figure 4:
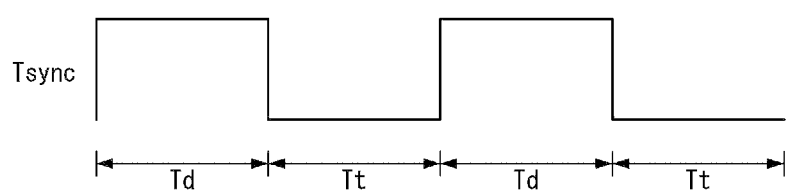
FIG. 4 is a waveform diagram illustrating an in-cell touch type time-division driving technology.

FIG. 1 is a block diagram schematically showing configuration of a display device according to a first embodiment of the disclosure. FIG. 2 schematically shows a touch sensor of a touch screen. FIG. 3 shows a touch screen including a common electrode. FIG. 4 is a waveform diagram illustrating an in-cell touch type time-division driving technology.

As shown in FIG. 1, the display device according to the first embodiment of the disclosure includes a timing controller 20, a data driving circuit 12, a scan driving circuit 14, a liquid crystal display panel DIS, a touch screen TSP, a touch screen driving circuit 30, and a microcontroller 40.

The timing controller 20 controls the data driving circuit 12 and the scan driving circuit 14. The timing controller 20 receives digital video data RGB and timing signals, such as a vertical sync signal Vsync, a horizontal sync signal Hsync, a data enable signal DE, and a main clock MCLK, from a host system (not shown).

The timing controller 20 controls the scan driving circuit 14 based on a scan timing control signal, such as a gate start pulse GSP, a gate shift clock GSC, and a gate output enable signal GOE. The timing controller 20 controls the data driving circuit 12 based on a data timing control signal, such as a source sampling clock SSC, a source output enable signal SOE, and a polarity control signal POL.

The data driving circuit 12 converts the digital video data RGB received from the timing controller 20 into positive and negative analog gamma compensation voltages and generates a data voltage. The data driving circuit 12 supplies the data voltage through data lines D1 to Dm, where m is an integer equal to or greater than 2.

The scan driving circuit 14 sequentially generates a gate pulse (or a scan pulse) synchronized with the data voltage. The scan driving circuit 14 supplies the gate pulse through gate lines G1 to Gn, where n is an integer equal to or greater than 2.

The liquid crystal display panel DIS displays an image based on the gate pulse supplied from the scan driving circuit 14 and the data voltage supplied from data driving circuit 12. The liquid crystal display panel DIS includes a liquid crystal layer formed between an upper substrate and a lower substrate. The liquid crystal display panel DIS may be implemented in any known liquid crystal mode including a twisted nematic (TN) mode, a vertical alignment (VA) mode, an in-plane switching (IPS) mode, a fringe field switching (FFS) mode, etc.

Subpixels of the liquid crystal display panel DIS are defined by the data lines D1 to Dm and the gate lines G1 to Gn. Each subpixel includes a thin film transistor (TFT) formed at a crossing of the data line and the gate line, a pixel electrode charged with the data voltage, a storage capacitor Cst that is connected to the pixel electrode and maintains a voltage of a liquid crystal cell.

Black matrixes, color filters, etc. are formed on the upper substrate of the liquid crystal display panel DIS. The TFTs, the pixel electrodes, the common electrode, etc. are formed on the lower substrate of the liquid crystal display panel DIS. The liquid crystal display panel DIS may be configured as a COT (color filter on TFT) structure. In this instance, the black matrixes and the color filters may be formed on the lower substrate of the liquid crystal display panel DIS.

The common electrode, to which a common voltage Vcom is supplied, may be formed on the upper substrate or the lower substrate of the liquid crystal display panel DIS. Polarizing plates are respectively attached to the upper substrate and the lower substrate of the liquid crystal display panel DIS. Alignment layers for setting a pre-tilt angle of liquid crystals are respectively formed on the inner surfaces contacting the liquid crystals in the upper substrate and the lower substrate of the liquid crystal display panel DIS.

A column spacer is formed between the upper substrate and the lower substrate of the liquid crystal display panel DIS to keep a cell gap of the liquid crystal cells constant. A backlight unit is disposed under a back surface of the liquid crystal display panel DIS. The backlight unit may be implemented as one of an edge type backlight unit and a direct type backlight unit and irradiates light onto the liquid crystal display panel DIS.

The touch screen driving circuit 30 senses a touch or non-touch operation and a touch position using the touch screen TSP. The touch screen driving circuit 30 includes a driving circuit generating a driving voltage for driving touch sensors and a sensing circuit, which senses the touch sensors and generates data for detecting the touch or non-touch operation and coordinate information. The driving circuit and the sensing circuit of the touch screen driving circuit 30 may be configured as one integrated circuit (IC) or may be separately configured depending on a function.

The touch screen driving circuit 30 is formed on an external substrate connected to the liquid crystal display panel DIS. The touch screen driving circuit 30 is connected to the touch screen TSP through sensing lines L1 to Li, where "i" is a positive integer. The touch screen driving circuit 30 senses the touch or non-touch operation and the touch position based on a deviation between capacitances of the touch sensors formed on the touch screen TSP.

There is a deviation between a capacitance of a touch position of a user using his or her finger and a capacitance of a non-touch position of the user. The touch screen driving circuit 30 senses the deviation between the capacitances and senses the touch or non-touch operation and the touch position. The touch screen driving circuit 30 produces touch data for sensing the touch or non-touch operation and the touch position and transmits the touch data to the microcontroller 40.

The microcontroller 40 controls the touch screen driving circuit 30. The microcontroller 40 receives a first touch sync signal ITsync from the timing controller 20. The microcontroller 40 produces a second touch sync signal Tsync for controlling the touch screen driving circuit 30 in response to the first touch sync signal ITsync.

The touch screen driving circuit 30 and the microcontroller 40 transmit and receive the touch data and various signals to and from each other based on an interface IF defined between them. The microcontroller 40 transmits the touch data to the host system (not shown). In the above description, the touch screen driving circuit 30 and the microcontroller 40 are separate devices, as an example. However, the touch screen driving circuit 30 and the microcontroller 40 may be configured as an IC type touch screen controller.

As shown in FIG. 2, the touch screen TSP may be embedded in a display area AA of the liquid crystal display panel DIS in an in-cell self capacitance touch manner (hereinafter, abbreviated to "self touch manner"). The touch screen TSP of a self touch sensing manner uses electrodes, which are formed inside the liquid crystal display panel DIS and are configured as blocks (or points), as the touch sensors.

In FIG. 2, "C1, C2, C3, and C4" denote the touch sensors (or touch sensor blocks) formed in the display area AA of the liquid crystal display panel DIS, and "L1, L2, L3, and L4 to Li" denote the sensing lines connected to the touch sensors. In the following description, the embodiment of the disclosure is described using the touch sensor configured as the common electrode as an example.

As shown in FIG. 3, the touch screen TSP of the self touch sensing manner forms common electrodes COM included in M subpixels (for example, 32×32 subpixels) formed inside the liquid crystal display panel DIS as one touch sensor, where M is an integer equal to or greater than 4. Namely, the touch sensors C1, C2, C3, and C4 are defined by the common electrodes COM separated formed on the liquid crystal display panel DIS.

As shown in FIGS. 1 to 4, the display device having the touch screen of the self touch sensing manner time-divides one frame period into a display driving period Td for displaying an image on the liquid crystal display panel DIS and a touch screen driving period Tt for sensing the touch screen TSP. Namely, the display device is time-division driven during the display driving period Td and the touch screen driving period Tt. The state of the touch sync signal Tsync indicates whether the display device is in a display driving period Td or touch driving period Tt.

The touch screen driving circuit 30 supplies a touch driving signal Tdrv through the sensing lines L1 to Li connected to the touch screen TSP of the self touch sensing manner.

During the touch screen driving period Tt, the touch driving signal Tdrv is supplied to the sensing lines L1 to Li. On the other hand, during the display driving period Td, the common voltage Vcom is supplied to the sensing lines L1 to Li. The touch driving signal Tdrv is produced in the form of an AC (alternating current) signal. The time-division drive of the display driving period Td and the touch screen driving period Tt is performed in response to the second touch sync signal Tsync.

Figure 5:
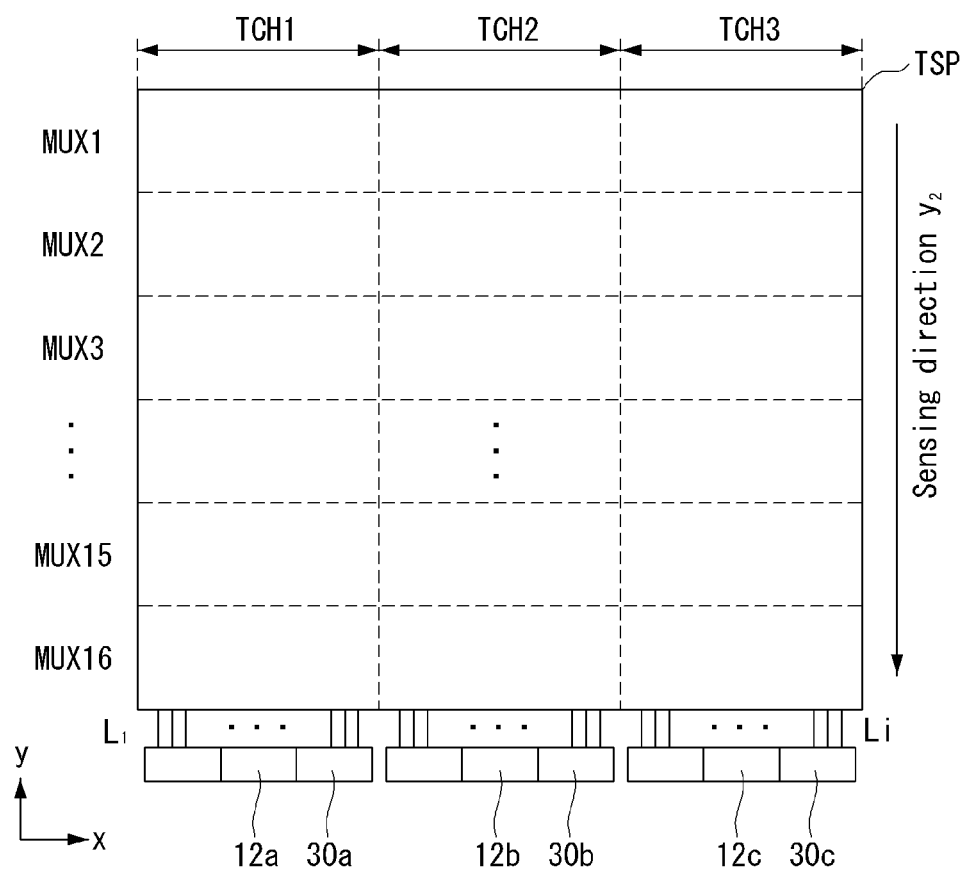
FIG. 5 shows a touch screen so as to explain a sensing concept of a self touch sensing manner on a per line basis.
Figure 6:
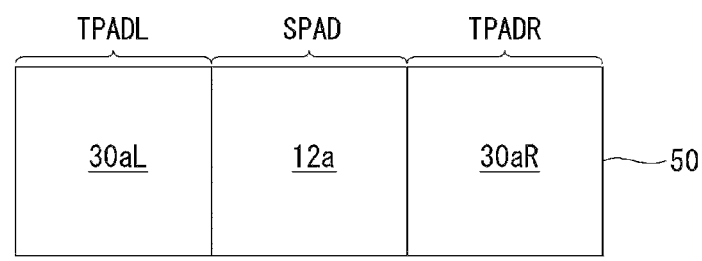
FIG. 6 illustrates a block of an integrated driving circuit shown in FIG. 5.
Figure 7:
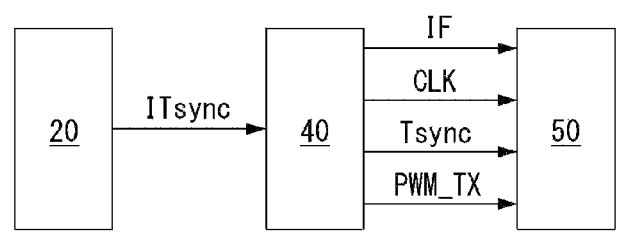
FIG. 7 illustrates a driving system of a self touch sensing manner.
Figure 8:
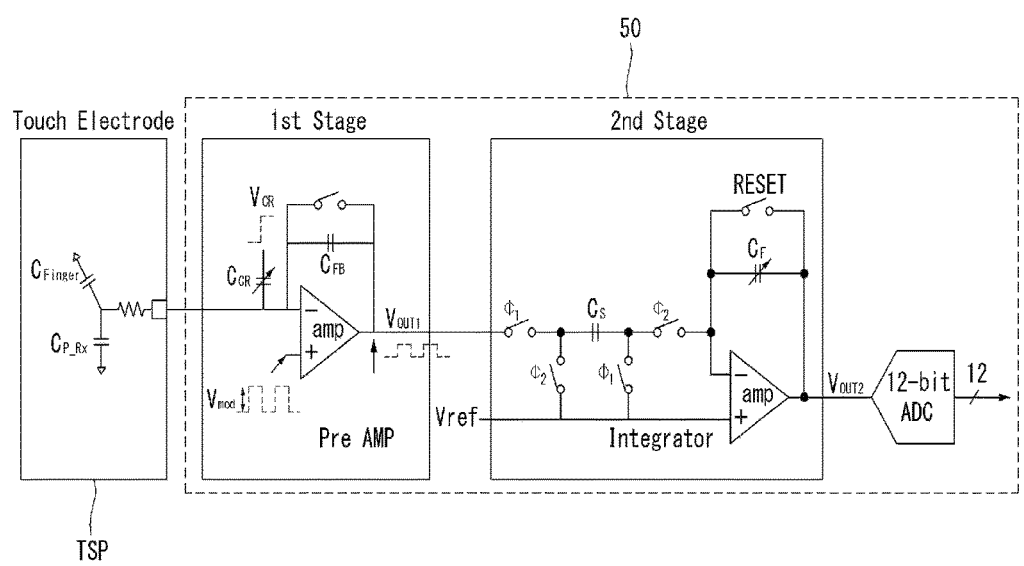
FIG. 8 illustrates an operation of an integrated driving circuit shown in FIG. 6.

FIG. 5 shows the touch screen so as to explain a sensing concept of the self touch sensing manner on a per line basis. FIG. 6 illustrates a block of an integrated driving circuit shown in FIG. 5. FIG. 7 illustrates a driving system of the self touch sensing manner. FIG. 8 illustrates an operation of an integrated driving circuit shown in FIG. 6.

As shown in FIG. 5, driving circuits 12a to 12c and 30a to 30c for driving the touch screen TSP are disposed at one side (for example, the lower side) of the touch screen TSP. A touch sensing area of the touch screen TSP may be divided into three areas in a predetermined direction, for example, a horizontal direction x. In other embodiments, the touch sensing area may be divided into a different number of areas in the horizontal direction x, depending on the display design and the physical driving range of the driving circuits.

The first driving circuits 12a and 30a are disposed in a left area so as to sense a first touch channel TCH1, and the second driving circuits 12b and 30b are disposed in a middle area so as to sense a second touch channel TCH2. The third driving circuits 12c and 30c are disposed in a right area so as to sense a third touch channel TCH3.

The first to third driving circuits 12a to 12c and 30a to 30c include data driving circuits 12a to 12c and touch screen driving circuits 30a to 30c. Namely, the data driving circuits 12a to 12c and the touch screen driving circuits 30a to 30c are combined to implement an integrated driving circuit.

The first to third driving circuits 12a to 12c and 30a to 30c may time-divide and sense the touch screen TSP on a per line basis by a multiplexer (mux) included inside the driver circuits 12a-12c, 30a-30c, or outside of the driver circuits 12a-12c, 30a-30c. For example, the touch sensing area of the touch screen TSP may be divided into 16 areas in a vertical direction y. In other embodiments, the touch sensing area may be divided into a different number of areas in the vertical direction y, depending on the display design and the physical driving range of the driving circuits.

The first to third driving circuits 12a to 12c and 30a to 30c may sequentially sense a first mux line MUX1 to a sixteenth mux line MUX16 (or an Ith mux line MUXI) of the touch screen TSP by the multiplexer included in the inside or the outside, where I is an integer equal to or greater than 2. The sensing of the touch screen TSP may be performed from the upper side to the lower side of the touch screen TSP, namely, in a sensing direction y2.

As shown in FIG. 6, an integrated driving circuit 50 may be configured so that the data driving circuit (sometimes called a source IC or a source part) 12a is disposed in the middle of the integrated driving circuit 50, and touch screen driving circuits (sometimes called readout IC (ROIC)) 30aL and 30aR are respectively disposed on the left and right sides of the integrated driving circuit 50. A data pad SPAD of the data driving circuit 12a is connected to the data lines of the liquid crystal display panel DIS, and touch pads TPADL and TPADR of the touch screen driving circuits 30aL and 30aR are connected to the sensing lines of the touch screen TSP.

As shown in FIG. 7, when the data driving circuits 12a to 12c and the touch screen driving circuits 30a to 30 are implemented as the integrated driving circuit 50, it has the following driving system.

The timing controller 20 produces the first touch sync signal ITsync. The timing controller 20 controls the microcontroller 40 based on the first touch sync signal ITsync.

The microcontroller 40 produces the second touch sync signal Tsync, a clock CLK, and a pulse width modulation signal PWM_TX based on the first touch sync signal ITsync received from the timing controller 20. The microcontroller 40 controls the integrated driving circuit 50 based on the second touch sync signal Tsync, the clock CLK, and the pulse width modulation signal PWM_TX.

The integrated driving circuit 50 drives the touch screen TSP based on the second touch sync signal Tsync, the clock CLK, and the pulse width modulation signal PWM_TX. The microcontroller 40 and the integrated driving circuit 50 transmit and receive the touch data sensed from the touch screen TSP to and from each other through an interface IF defined between the microcontroller 40 and the integrated driving circuit 50.

The above-described self touch sensing manner may be implemented as a sensing structure, in which the touch sensor of the touch screen TSP is divided on a per electrode basis, and all points of the touch screen TSP can be sensed. The above structure may perform a load free drive (LFD) which supplies the touch driving signal and other signals (the data signal, the gate signal, and the common voltage) having the same voltage or the same phase as the touch driving signal and minimizes a load of the liquid crystal display panel DIS.

As shown in FIGS. 7 and 8, the integrated driving circuit 50 may perform the touch sensing using switched-capacitor circuits in a charge transfer method. The switched-capacitor circuits may include a first stage having a preamplifier (preamp), etc. and a second stage having an integrator, a sample and hold amplifier, etc.

The first stage obtains a first gain voltage VOUT1 using a non-inverting preamplifier, etc. The first gain voltage VOUT1 output from the first stage is represented by the following Equation 1.

$$V_{OUT1} = \left\{1 + \frac{(C_{P\_Rx} + C_{Finger})}{C_{FB}}\right\} \cdot V_{mod} - \frac{C_{CR}}{C_{FB}} \cdot V_{CR} \quad \text{[Equation 1]}$$

In the above Equation 1, $C_{P\_RX}$ is an initial capacitance, $C_{Finger}$ is a capacitance of a touch position the user touches with his or her finger, $V_{mod}$ is a modulation voltage (driving voltage) for producing a driving pulse signal, $C_{CR}$ is a charge removing capacitance for removing the initial capacitance, $C_{FB}$ is a feedback capacitance for converting an amount of charges into the voltage, and $V_{CR}$ is a charge removing reference voltage.

The second stage obtains a second gain voltage VOUT2 using the integrator, the sample and hold amplifier, etc. The second gain voltage VOUT2 output from the second stage is represented by the following Equation 2.

$$V_{OUT2} = \frac{C_S}{C_F} \cdot V_{out1} \qquad \text{[Equation 2]}$$

In the above Equation 2, $C_F$ is a feedback capacitance for converting an amount of charges into the voltage, and $C_S$ is a storage capacitance.

When the integrated driving circuit 50 applies a driving pulse signal VMOD to the preamplifier connected to the sensing lines L1 to Li of the touch screen TSP, an output voltage of the preamplifier varies depending on whether or not the user performs the touch operation with his or her finger.

The driving pulse signal VMOD has a phase synchronized with a phase of the pulse width modulation signal PWM_TX output from the microcontroller 40 and has a voltage level different from the pulse width modulation signal PWM_TX. The integrated driving circuit 50 may perform the charge removal for removing the initial capacitance. An output value of the preamplifier is accumulated through the integrator based on the number of driving pulse signals VMOD.

Some of the display devices, to which the in-cell touch sensor manner is applied, have to satisfy the VESA standard. The in-cell touch sensor manner uses the integrated driving circuit, in which the touch screen driving circuit (for example, the ROIC) is embedded in the data driving circuit, due to its structural characteristics.

In this instance, the integrated driving circuit has to supply the common voltage to the liquid crystal display panel. However, there is a considerable limit to a distance between a flexible printed circuit board (FPCB) and an input terminal of the integrated driving circuit because of a limit of the size attributable to the VESA standard. Because of this, in a related art, predetermined electric power is supplied only to one side of the integrated driving circuit, so as to satisfy an input resistance requirement of the integrated driving circuit.

For this reason, when a predetermined pattern is represented on the liquid crystal display panel, the related art method generates a block dim (indicating a phenomenon in which the screen of the liquid crystal display panel becomes dim on a per block basis) attributable to a deviation of the common voltage and reduces the display quality of the liquid crystal display panel.

Hereinafter, problems of the related art method and the embodiment of the disclosure for solving the problems of the related art method are described in detail.

[Related Art Structure]

Figure 9:
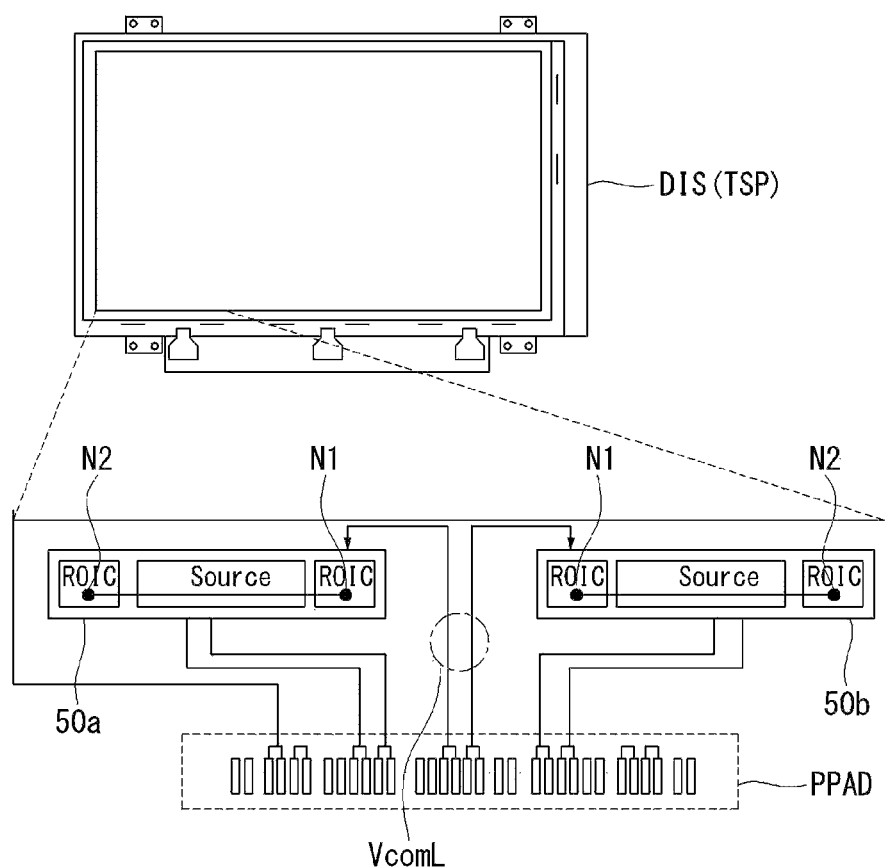
FIG. 9 shows a related art integrated driving circuit applied to a display device.
Figure 10:
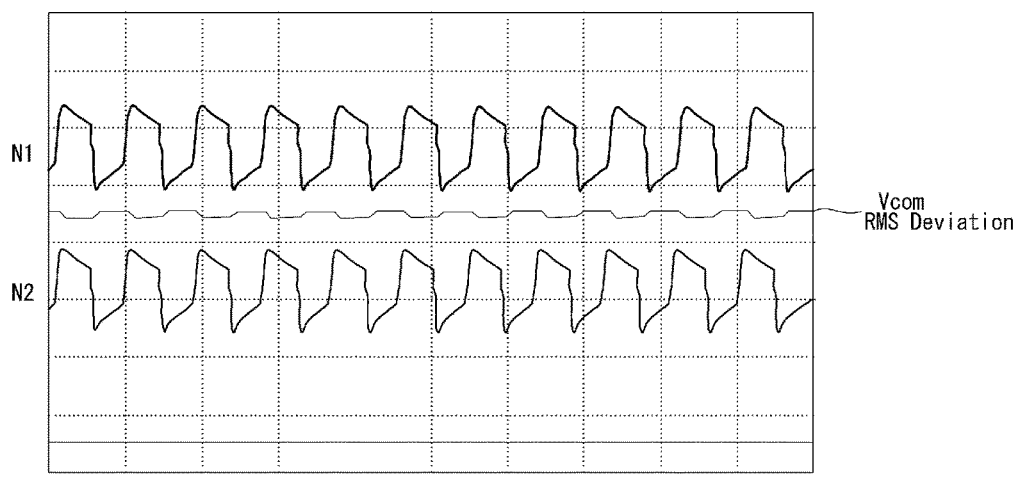
FIG. 10 illustrates a deviation of a common voltage generated in the related art method.
Figure 11:
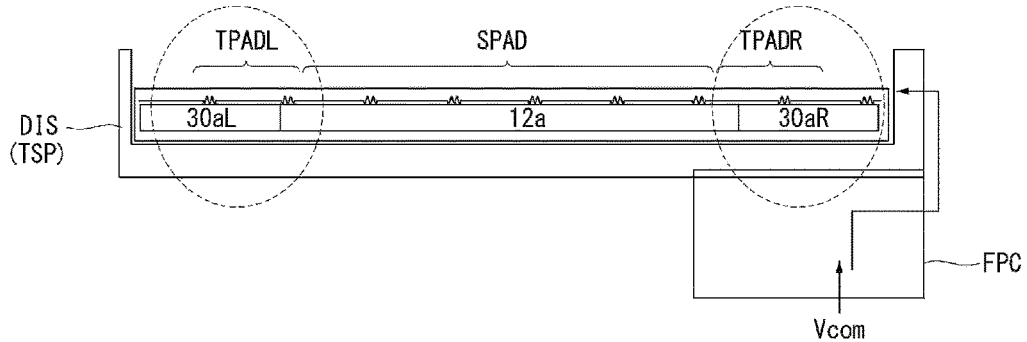
FIG. 11 illustrates a level deviation of a common voltage attributable to a resistance difference of a related art integrated driving circuit.
Figure 12:
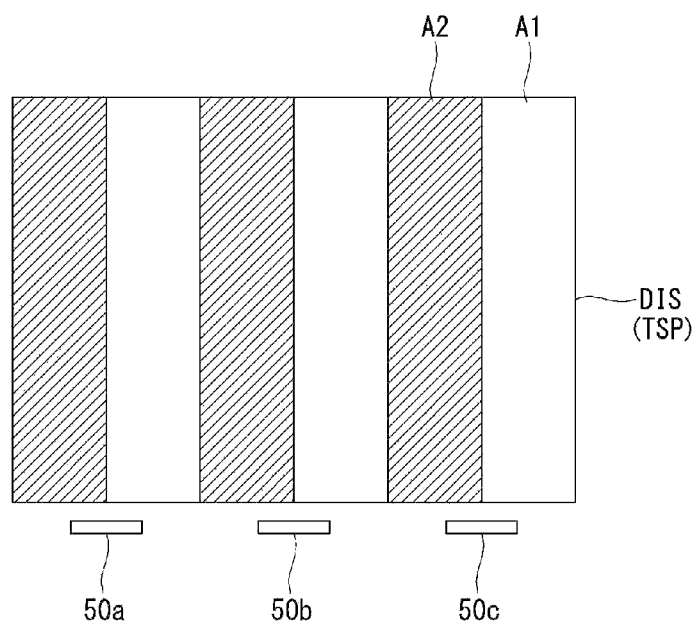
FIG. 12 illustrates problems of a related art method.

FIG. 9 shows a related art integrated driving circuit applied to a display device. FIG. 10 illustrates a deviation of a common voltage generated in the related art method. FIG. 11 illustrates a level deviation of the common voltage attributable to a resistance difference of the related art integrated driving circuit. FIG. 12 illustrates problems of the related art method.

As shown in FIGS. 9 to 12, related art first and second integrated driving circuits 50a and 50b are electrically connected to a liquid crystal display panel DIS having a touch screen TSP. There is a limit to an input distance between a FPCB and the first and second integrated driving circuits 50a and 50b, so that a power supply method of a related art structure satisfies the VESA standard.

Because of this, electric power, having a low resistance requirement and including a common voltage transferred through a common voltage line VcomL, may be supplied only to the sides of the first and second integrated driving circuits 50a and 50b. For example, the first integrated driving circuit 50a receives the common voltage through the common voltage line VcomL connected to the right side of the first integrated driving circuit 50a, and the second integrated driving circuit 50b receives the common voltage through the common voltage line VcomL connected to the left side of the second integrated driving circuit 50b.

According to this, the common voltage supplied through a pad PPAD formed on the liquid crystal display panel DIS is supplied to first nodes N1 of the first and second integrated driving circuits 50a and 50b, which are positioned close to an input position of the common voltage, and then is transferred to second nodes N2 of the first and second integrated driving circuits 50a and 50b, which are positioned far away from the input position of the common voltage, along an internal power supply line included in an internal circuit. As a result, the common voltage supplied to the sides of the first and second integrated driving circuits 50a and 50b is transferred to both sides of each of the first and second integrated driving circuits 50a and 50b, on which a touch screen driving circuit is positioned.

As shown in FIG. 10, because the related art method supplies the common voltage only to the sides of the first and second integrated driving circuits 50a and 50b, a deviation of a root mean square (RMS) between both sides N1 and N2 of an input terminal, to which the common voltage Vcom is input, is generated when a pattern having a strong data transition is displayed on the liquid crystal display panel DIS (refer to FIG. 10).

However, the current in-cell touch sensor technology cannot perform inverting compensation on each of all of the common voltages. When a specific point is compensated for, another point is excessively compensated for. Therefore, the inverting compensation cannot be performed.

Further, there is a limit to the number of FPCBs and a space of a panel link unit (line-on-glass line) connected to input signal lines of the integrated driving circuits, so as to satisfy the VESA standard. Because of this, only one FPCB is assigned to each of the first and second integrated driving circuits due to a mechanical interference.

Because a power input terminal (the common voltage line) having a low resistance requirement (line-on-glass resistance) is connected only to one side of the integrated driving circuit, a voltage level deviation between the common voltages of both terminals N1 and N2 of left and right touch screen driving circuits 30aL and 30aR is generated due to an internal line resistance difference (refer to FIGS. 9 and 11).

For this reason and referring to FIG. 12, when a predetermined pattern is displayed on the liquid crystal display panel, the related art method results in block dimming (a phenomenon in which some blocks of the screen of the liquid crystal display panel are dimmer than other blocks) due to the deviation of the common voltage Vcom. The block dimming is indicated by A1 and A2 of FIG. 12, thereby reducing the display quality of the liquid crystal display panel.

[Structure According to an Embodiment of the Disclosure]

Figure 13:
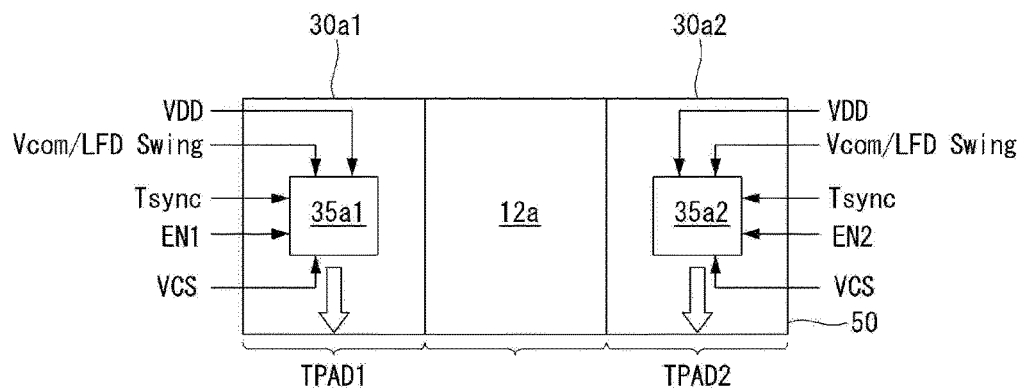
FIG. 13 schematically shows an integrated driving circuit according to an exemplary embodiment of the disclosure.
Figure 14:
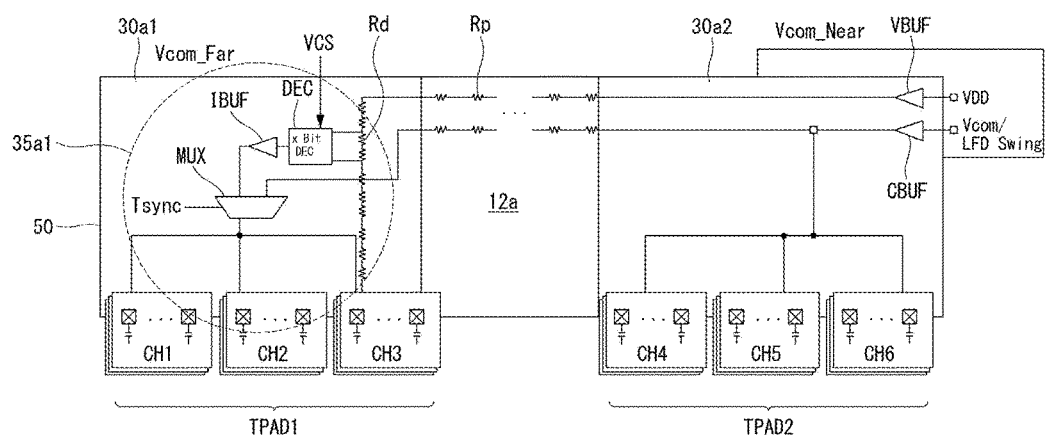
FIGS. 14 and 15 illustrate in detail a portion of the integrated driving circuit shown in FIG. 13.
Figure 15:
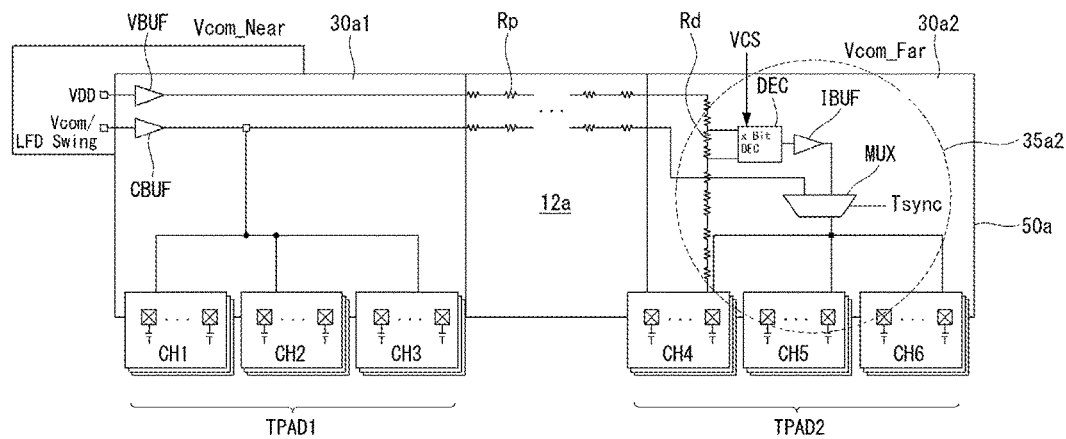
Figure 16:
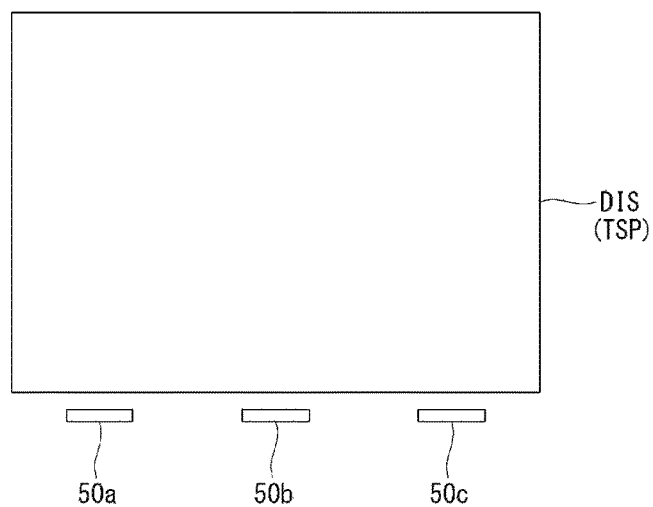
FIG. 16 illustrates improvements according to an exemplary embodiment of the disclosure.

FIG. 13 schematically shows an integrated driving circuit according to an exemplary embodiment of the disclosure. FIGS. 14 and 15 illustrate in detail a portion of the integrated driving circuit shown in FIG. 13. FIG. 16 illustrates improvements according to an exemplary embodiment of the disclosure.

As shown in FIG. 13, an integrated driving circuit 50 according to an exemplary embodiment of the disclosure includes a pair of common voltage compensation circuits 35a1 and 35a2. Namely, a first touch screen driving circuit 30a1 of the integrated driving circuit 50 includes the first common voltage compensation circuit 35a1, and a second touch screen driving circuit 30a2 of the integrated driving circuit 50 includes the second common voltage compensation circuit 35a2. The pair of common voltage compensation circuits 35a1 and 35a2 compensate the common voltage in a programmable manner.

Each of the first and second common voltage compensation circuits 35a1 and 35a2 may, when enabled, output a compensated common voltage to a channel in response to a second touch sync signal Tsync or may perform a load free drive (LFD swing) in response to the second touch sync signal Tsync by driving the channel with touch driving signals.

The first and second common voltage compensation circuits 35a1 and 35a2 may be selectively activated/enabled in response to first and second activation/enable signals EN1 and EN2. The first and second activation signals EN1 and EN2 may be output from a timing controller or a microcontroller. The first and second activation signals EN1 and EN2 may be transmitted via a direct connection between output pins of the controller and input pins of the common voltage compensation circuit. Alternatively, the first and second activation signals EN1 and EN2 may be transmitted from output pins of the controller to input pins of the common voltage compensation circuit through an intermediate component between the controller and the common voltage compensation circuit.

For example, when the first common voltage compensation circuit 35a1 is positioned far away from an input terminal of the common voltage, the first common voltage compensation circuit 35a1 may be activated in response to the first activation signal EN1. In this instance, the second common voltage compensation circuit 35a2 may be deactivated. Further, when the second common voltage compensation circuit 35a2 is positioned far away from the input terminal of the common voltage, the second common voltage compensation circuit 35a2 may be activated in response to the second activation signal EN2. In this instance, the first common voltage compensation circuit 35a1 may be deactivated.

The activated common voltage compensation circuit 35a1 or 35a2 varies and outputs the compensated common voltage for compensating for the dropped common voltage using a high potential voltage VDD (or a voltage forming the data signal) as a reference voltage, so as to compensate for IR drop of the common voltage.

The common voltage compensation circuit 35a1 or 35a2 programmably changes a compensation ratio of the compensated common voltage in response to a common voltage compensation signal VCS output from the timing controller or the microcontroller, thereby controlling a voltage level of the compensated common voltage. The level of the compensated common voltage is set such that the common voltages output by the pair of touch screen driving circuits are at substantially equal voltage levels. For this, the controller produces the common voltage compensation signal VCS based on voltage information (a lookup table), which corresponds to an image or a pattern and voltage loss inside the integrated driving circuit 50.

When the pair of common voltage compensation circuits 35a1 and 35a2 are embedded in the integrated driving circuit 50 and are independently activated as in the embodiment of the disclosure, one of the common voltage compensation circuits 35a1 and 35a2 is positioned close to the input terminal of the common voltage and the other is positioned far away from the input terminal of the common voltage depending on a formation position of the integrated driving circuit 50. Thus, an RMS deviation is generated between both sides of the integrated driving circuit 50 because of such a distance difference.

When the pair of common voltage compensation circuits 35a1 and 35a2 included in the integrated driving circuit 50 are positioned far away from the power input terminal, both of the pair of common voltage compensation circuits 35a1 and 35a2 may be activated.

As shown in FIG. 14, the common voltage Vcom may be supplied through the right side of the integrated driving circuit 50. Namely, the right side of the integrated driving circuit 50 is closer to the input terminal to which the electric power, such as the common voltage Vcom, is input.

In this instance, the first touch screen driving circuit 30a1 of the integrated driving circuit 50 corresponds to a far area Vcom_Far far away from the input terminal of the electric power (for example, the common voltage Vcom), and the second touch screen driving circuit 30a2 of the integrated driving circuit 50 corresponds to a close area Vcom_Near close to the input terminal of the electric power Vcom.

The controller activates the first common voltage compensation circuit 35a1 of the first touch screen driving circuit 30a1 and deactivates the second common voltage compensation circuit 35a2 of the second touch screen driving circuit 30a2. Hence, the first common voltage compensation circuit 35a1 outputs the compensated common voltage through its channels CH1 to CH3, and the second common voltage compensation circuit 35a2 outputs the common voltage Vcom through its channels CH4 to CH6.

As can be seen from the activated first common voltage compensation circuit 35a1, the common voltage compensation circuit 35a1 includes a resistor string Rd, a decoder DEC, a buffer IBUF, and a multiplexer MUX.

The decoder DEC provides the compensated common voltage in response to the common voltage compensation signal VCS and outputs it. The decoder DEC outputs the compensated common voltage for compensating for the dropped common voltage using the high potential voltage VDD (or a voltage forming the data signal) as a reference voltage. The decoder DEC adjusts the voltage output from the decoder DEC through a resistor string Rd and may output the compensated common voltage for compensating for the common voltage.

Specifically, the resistor string Rd includes several output taps that generate several reference voltages of different voltage levels. The decoder DEC receives the reference voltages from the resistor string Rd. Only two reference voltages are shown in FIG. 14 as being provided to the decoder DEC, but in practice more than two reference voltages are provided to the decoder DEC. The decoder DEC can be implemented as a multiplexer that selects one of the reference voltages to output as the compensated common voltage for compensating for the common voltage. When implemented as a multiplexer, the decoder DEC uses the common voltage compensation signal VCS as a control input to select from amongst the reference voltages.

The buffer IBUF buffers the compensated common voltage output from the decoder DEC and then transfers the buffered compensated common voltage to the multiplexer MUX. The buffer IBUF holds the compensated common voltage output from the decoder DEC for a predetermined period of time, which prevents the drop of the compensated common voltage output. The buffer IBUF may be omitted depending on the configuration of the common voltage compensation circuit 35a1.

The multiplexer MUX is configured as a 2-to-1 multiplexer (2-input and 1-output). The multiplexer MUX selectively outputs the compensated common voltage in response to the second touch sync signal Tsync or outputs a voltage capable of performing the load free drive (LFD swing) in response to the second touch sync signal Tsync.

For example, the multiplexer MUX outputs the compensated common voltage in response to the second touch sync signal Tsync during a display driving period and outputs a touch driving signal for the load free drive in response to the second touch sync signal Tsync during a touch screen driving period.

In FIG. 14, "Rp" denotes a parasitic resistance existing between the first touch screen driving circuit 30a1 and the second touch screen driving circuit 30a2, "VBUF" denotes a buffer of a first input terminal, to which the high potential voltage is input, and "CBUF" denotes a buffer of a second input terminal, to which the common voltage and the voltage for the load free drive are input.

Because the second common voltage compensation circuit 35a2 of the second touch screen driving circuit 30a2 is in an inactive state, the details of the second common voltage compensation circuit 35a2 are omitted from FIG. 14. As the first common voltage compensation circuit 35a1 is in an active state, the multiplexer MUX outputs the compensated common voltage in response to the second touch sync signal Tsync during the display driving period and outputs a signal for the load free drive in response to the second touch sync signal Tsync during the touch screen driving period.

As shown in FIG. 15, the common voltage Vcom may be supplied through the left side of the integrated driving circuit 50. Namely, the left side of the integrated driving circuit 50 is close to the input terminal, to which the electric power, such as the common voltage Vcom, is input.

In this instance, the second touch screen driving circuit 30a2 of the integrated driving circuit 50 corresponds to a far area Vcom_Far far away from the input terminal of the electric power (for example, the common voltage Vcom), and the first touch screen driving circuit 30a1 of the integrated driving circuit 50 corresponds to a near area Vcom_Near near to the input terminal of the electric power Vcom.

The controller deactivates the first common voltage compensation circuit 35a1 of the first touch screen driving circuit 30a1 and activates the second common voltage compensation circuit 35a2 of the second touch screen driving circuit 30a2. Hence, the first common voltage compensation circuit 35a1 outputs the common voltage Vcom through its channels CH1 to CH3, and the second common voltage compensation circuit 35a2 outputs the compensated common voltage through its channels CH4 to CH6.

As can be seen from the activated second common voltage compensation circuit 35a2, the common voltage compensation circuit 35a2 includes a resistor string Rd, decoder DEC, a buffer IBUF, and a multiplexer MUX.

The decoder DEC provides the compensated common voltage in response to the common voltage compensation signal VCS and outputs it. The decoder DEC outputs the compensated common voltage for compensating for the dropped common voltage using the high potential voltage (or a voltage forming the data signal) VDD as a reference voltage. The decoder DEC adjusts the voltage output from the decoder DEC through a resistor string Rd and may output the compensated common voltage for compensating for the common voltage.

Specifically, the resistor string Rd includes several output taps that generate several reference voltages of different voltage levels. The decoder DEC receives the reference voltages from the resistor string Rd. Only two reference voltages are shown in FIG. 15 as being provided to the decoder DEC, but in practice more than two reference voltages are provided to the decoder DEC. The decoder DEC can be implemented as a multiplexer that selects one of the reference voltages to output as the compensated common voltage for compensating for the common voltage. When implemented as a multiplexer, the decoder DEC uses the common voltage compensation signal VCS as a control input to select from amongst the reference voltages.

The buffer IBUF buffers the compensated common voltage output from the decoder DEC and then transfers the buffered compensated common voltage to the multiplexer MUX. The buffer IBUF holds the compensated common voltage output from the decoder DEC for a predetermined period of time, which prevents the drop of the compensated common voltage output. The buffer IBUF may be omitted depending on the configuration of the common voltage compensation circuit 35a2.

The multiplexer MUX is configured as a 2-to-1 multiplexer (2-input and 1-output). The multiplexer MUX outputs the compensated common voltage in response to the second touch sync signal Tsync or outputs a voltage capable of performing the load free drive (LFD swing) in response to the second touch sync signal Tsync.

For example, the multiplexer MUX outputs the compensated common voltage in response to the second touch sync signal Tsync during the display driving period and outputs a signal for the load free drive in response to the second touch sync signal Tsync during the touch screen driving period.

In FIG. 15, "Rp" denotes a parasitic resistance existing between the first touch screen driving circuit 30a1 and the second touch screen driving circuit 30a2, "VBUF" denotes a buffer of a first input terminal, to which the high potential voltage is input, and "CBUF" denotes a buffer of a second input terminal, to which the common voltage and the voltage for the load free drive are input.

Because the first common voltage compensation circuit 35a1 of the first touch screen driving circuit 30a1 is in an inactive state, the details of the first common voltage compensation circuit 35a1 are omitted from FIG. 15. As the second common voltage compensation circuit 35a2 is in an active state, the multiplexer MUX outputs the compensated common voltage in response to the second touch sync signal Tsync during the display driving period and outputs a signal for the load free drive in response to the second touch sync signal Tsync during the touch screen driving period.

The embodiment of the disclosure can selectively activate the circuits capable of compensating for the common voltage and outputting the compensated common voltage, irrespective of the formation position of the integrated driving circuit and a position of the power input terminal. Further, the embodiment of the disclosure can algorithmly drive (activate) the common voltage compensation circuit when a smear pattern having a strong data transition is generated. Further, because the embodiment of the disclosure can individually drive (activate) the common voltage compensation circuits embedded in the integrated driving circuit, the embodiment of the disclosure can perform the control with respect to a position of the smear pattern.

As a result, as shown in FIG. 16, the embodiment of the disclosure can uniformly maintain the display quality on the screen of the liquid crystal display panel without a reduction in the display quality resulting from block dimming (a phenomenon in which the screen of the liquid crystal display panel becomes dim on a per block basis) attributable to the deviation of the common voltage.

Furthermore, the embodiment of the disclosure can compensate the common voltage even if the common voltage is supplied only to one side of the integrated driving circuit. As a result, even if a pattern having a strong data transition is displayed on the liquid crystal display panel, the embodiment of the disclosure can prevent a RMS deviation from being generated between both sides of the input terminal, to which the common voltage is input.

The embodiment of the disclosure can solve the voltage deviation problem without inverting compensation considering that the current in-cell touch sensor technology cannot individually perform inverting compensation on the plurality of common voltages (the inverting compensation cannot be substantially performed because when a specific point is compensated for, another point is excessively compensated for).

As described above, the embodiment of the disclosure can uniformly maintain the display quality of the display device by preventing a reduction in the display quality resulting from the block dim mingattributable to the deviation of the common voltage when a predetermined pattern is displayed on the liquid crystal display panel. Further, the embodiment of the disclosure can satisfy the size limit attributable to the VESA standard without changes in the design of the formation position of the driving circuit.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
    an integrated circuit including:
        a first input terminal to receive a common voltage;
        a first touch pad for coupling to a first touch channel of a display device;
        a first touch driving circuit coupled to the first touch pad, the first touch driving circuit comprising a first common voltage compensation circuit to output one of the common voltage and a first compensated common voltage to the first touch pad when the first common voltage compensation circuit is activated, the first common voltage compensation circuit to output the other one of the common voltage and the first compensated common voltage to the first touch pad when the first common voltage compensation circuit is deactivated;
        a second touch pad for coupling to a second touch channel of the display device;
        a second touch driving circuit coupled to the second touch pad, the second touch driving circuit comprising a second common voltage compensation circuit to output one of the common voltage and a second compensated common voltage to the second touch pad when the second common voltage compensation circuit is activated, the second common voltage compensation circuit to output the other one of the common voltage and the second compensated common voltage to the second touch pad when the second common voltage compensation circuit is deactivated;
        a first pin to receive a first activation signal activating the first common voltage compensation circuit; and
        a second pin to receive a second activation signal activating the second common voltage compensation circuit; and
    a timing controller to generate the first activation signal and the second activation signal,
    wherein the first input terminal is further from the first common voltage compensation circuit than the second common voltage compensation circuit, and the timing controller generates the first activation signal to activate the first common voltage compensation circuit and generates the second activation signal to deactivate the second common voltage compensation circuit.

2. A display device comprising:
    a first touch channel;
    a second touch channel; and
    an integrated circuit comprising:
        a first input terminal to receive a common voltage from a common voltage line separate from the integrated circuit;
        a second input terminal to receive a supply voltage;
        a first touch pad coupled to the first touch channel of the display device;
        a second touch pad coupled to the second touch channel of the display device;
        a first touch driving circuit coupled to the first touch pad, the first touch driving circuit to generate a compensated common voltage based on the supply voltage and to output the compensated common voltage onto the first touch pad, the first touch driving circuit to selectively output either the compensated common voltage or a touch driving signal responsive to a signal indicating a division between a touch driving period and a display driving period; and
        a second touch driving circuit coupled to the second touch pad, the second touch driving circuit to output the common voltage onto the second touch pad.

3. The display device of claim 2, wherein the first touch driving circuit comprises:
    a resistor string to generate a plurality of different voltages based on the supply voltage; and
    a circuit to select the compensated common voltage from amongst the plurality of different voltages.

4. The display device of claim 2, wherein first touch driving circuit adjusts the first compensated common mode voltage based on a common voltage compensation signal.

5. The display device of claim 2, wherein the first touch driving circuit is located on a first side of the integrated circuit, the second touch driving circuit is located on a second side of the integrated circuit, and a data driving circuit is located between the first touch driving circuit and the second touch driving circuit.

6. The display device of claim 2, wherein the first touch driving circuit is located at a first side of the integrated circuit and the second touch driving circuit is located at a second side of the integrated circuit, wherein the first input terminal is further from the first touch driving circuit that outputs the compensated common voltage than the second touch driving circuit that outputs the common voltage.

7. An integrated circuit, comprising:
a first input terminal to receive a common voltage;
a first touch pad for coupling to a first touch channel of a display device; and
a first touch driving circuit coupled to the first touch pad, the first touch driving circuit comprising a first common voltage compensation circuit to output one of the common voltage and a first compensated common voltage to the first touch pad when the first common voltage compensation circuit is activated, the first common voltage compensation circuit to output the other one of the common voltage and the first compensated common voltage to the first touch pad when the first common voltage compensation circuit is deactivated,
the first common voltage compensation circuit to, when activated, select between the first compensated common voltage and a touch driving signal for output responsive to a signal indicating a division between a touch driving period and a display driving period.

8. The integrated circuit of claim 7, further comprising:
a second input terminal to receive a supply voltage,
wherein the first compensated common voltage is derived from the supply voltage.

9. The integrated circuit of claim 7, wherein the first common voltage compensation circuit comprises:
a resistor string to generate a plurality of different voltages based on the supply voltage; and
a circuit to select the first compensated common voltage from amongst the plurality of different voltages.

10. The integrated circuit of claim 7, wherein the common voltage compensation circuit adjusts the first compensated common voltage based on a common voltage compensation signal.

11. The integrated circuit of claim 7, further comprising:
a second touch pad for coupling to a second touch channel of the display device; and
a second touch driving circuit coupled to the second touch pad, the second touch driving circuit comprising a second common voltage compensation circuit to output one of the common voltage and a second compensated common voltage to the second touch pad when the second common voltage compensation circuit is activated, the second common voltage compensation circuit to output the other one of the common voltage and the second compensated common voltage to the second touch pad when the second common voltage compensation circuit is deactivated.

12. The integrated circuit of claim 11, wherein the first touch driving circuit is located on a first side of the integrated circuit, the second touch driving circuit is located on a second side of the integrated circuit, and a data driving circuit is located between the first touch driving circuit and the second touch driving circuit.

13. The integrated circuit of claim 11, further comprising:
a first pin to receive a first activation signal activating the first common voltage compensation circuit; and
a second pin to receive a second activation signal activating the second common voltage compensation circuit.

14. The integrated circuit of claim 11, wherein the first touch driving circuit is located at a first side of the integrated circuit and the second touch driving circuit is located at a second side of the integrated circuit, wherein the first input terminal is further from the first common voltage compensation circuit than the second common voltage compensation circuit, the integrated circuit further comprising:
a first pin to receive a first activation signal that activates the first common voltage compensation circuit at the first side of the integrated circuit such that the first common voltage compensation circuit outputs the first compensated common voltage; and
a second pin to receive a second activation signal that deactivates the second common voltage compensation circuit at the second side of the integrated circuit such that the second common voltage compensation circuit outputs the common voltage.

* * * * *